United States Patent
Gryczynski et al.

(10) Patent No.: US 9,376,315 B2
(45) Date of Patent: Jun. 28, 2016

(54) POLARIZED FLUORESCENT NANOSPHERES

(75) Inventors: Zygmunt Gryczynski, Fort Worth, TX (US); Ignacy Gryczynski, Fort Worth, TX (US); Rafal Luchowski, Lublin (PL); Julian Borejdo, Dallas, TX (US)

(73) Assignee: University of North Texas Health Science Center at Fort Worth, Fort Worth, TX (US)

( * ) Notice: Subject to any disclaimer, the term of this patent is extended or adjusted under 35 U.S.C. 154(b) by 1221 days.

(21) Appl. No.: 13/030,048

(22) Filed: Feb. 17, 2011

(65) Prior Publication Data

US 2011/0207614 A1 Aug. 25, 2011

Related U.S. Application Data

(60) Provisional application No. 61/305,864, filed on Feb. 18, 2010.

(51) Int. Cl.
| | |
|---|---|
| C09K 11/06 | (2006.01) |
| B82Y 20/00 | (2011.01) |
| B82Y 5/00 | (2011.01) |
| B82Y 15/00 | (2011.01) |
| B82Y 25/00 | (2011.01) |
| C09K 11/02 | (2006.01) |
| H01F 1/00 | (2006.01) |

(52) U.S. Cl.
CPC ............... *B82Y 15/00* (2013.01); *B82Y 20/00* (2013.01); *B82Y 25/00* (2013.01); *C09K 11/02* (2013.01); *H01F 1/0063* (2013.01)

(58) Field of Classification Search
CPC .... C09K 11/06; H01L 51/5012; B82Y 20/00; B82Y 5/00
See application file for complete search history.

(56) References Cited

U.S. PATENT DOCUMENTS 7,119,161 B2 * 10/2006 Lawandy ............... B82Y 30/00
345/211

OTHER PUBLICATIONS

M. A. Van Dijk et al., Combining Optical Trapping and Single-Molecule Fluorescence Spectroscopy: Enhanced Photobleaching of Flurophores, 108 J. Phys. Chem. B 6479-6484 (2004).*
R. Luchowski et al., Polarized Fluroescent Nanospheres, 18 Opt. Express 4289-4299 (2010).*

* cited by examiner

*Primary Examiner* — Randy Boyer
(74) *Attorney, Agent, or Firm* — Edwin S. Flores; Chalker Flores, LLP

(57) ABSTRACT

The present invention provides partially fluorescent nanoparticles and methods of making and using the partially fluorescent nanoparticle having a nanoparticle with a matrix and a fluorescent dye dispersed in or about the matrix, wherein at least a portion of the fluorescent dye has been anisotropically bleached.

19 Claims, 13 Drawing Sheets

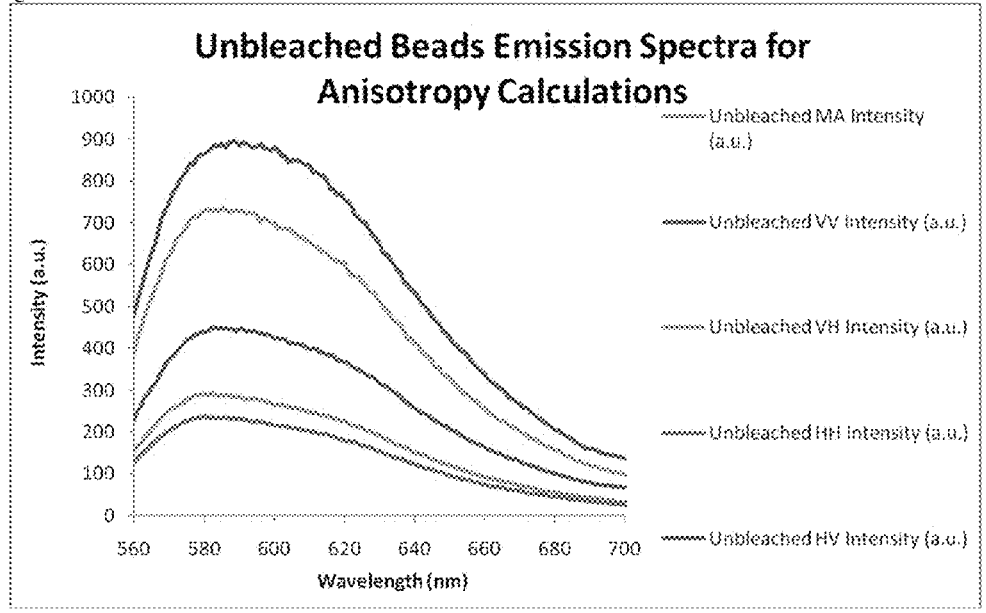

Fig. 7A and Fig 7B
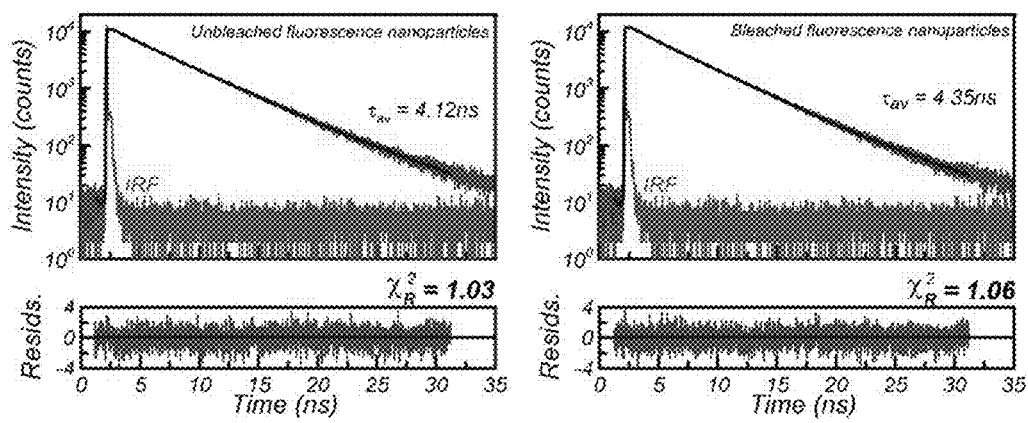
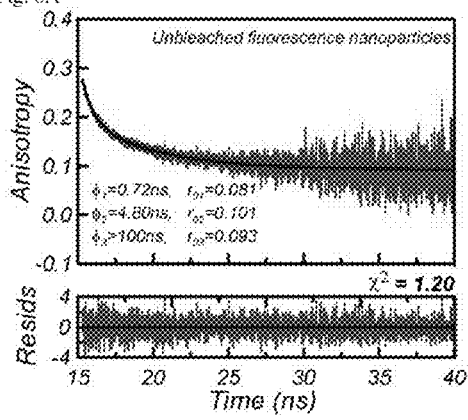
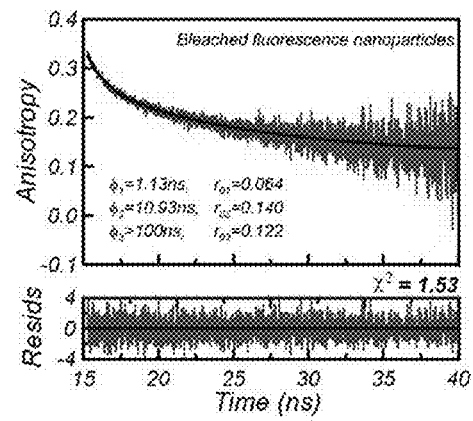

Figs. 14A-14D
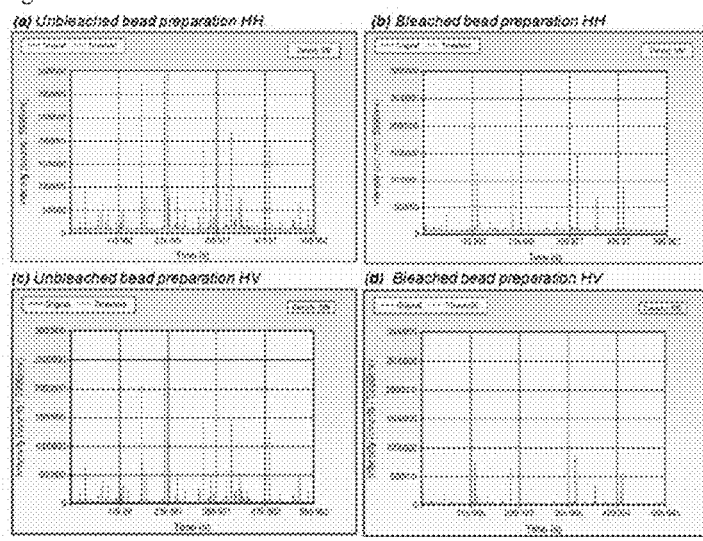
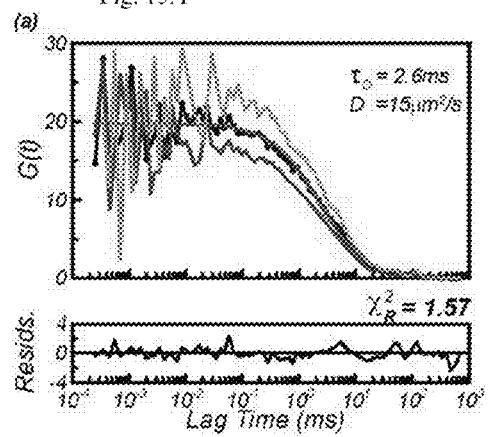
Fig. 15A
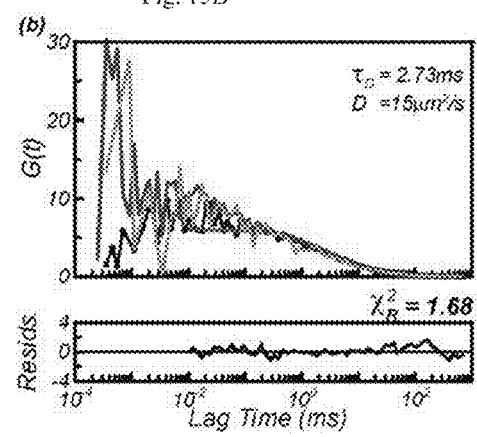
Fig. 15B

POLARIZED FLUORESCENT NANOSPHERES

CROSS-REFERENCE TO RELATED APPLICATIONS

This Non-Provisional Patent Application claims priority to U.S. Provisional Patent Application Ser. No. 61/305,864, filed Feb. 18, 2009, the contents of which are all incorporated by reference herein in their entirety.

TECHNICAL FIELD OF THE INVENTION

The present invention relates in general to the field of fluorescence spectroscopy and microscopy, specifically to compositions of matter and methods of making and using fluorescence beads having highly polarized fluorescence through photoselective bleaching.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with fluorescence spectroscopy and microscopy fluorescence. Fluorescence is a phenomenon that has provided many useful applications and fluorescence spectroscopy is a rapidly developing and crucial component in the areas of flow cytometry, medical diagnostics, DNA sequencing, genetics and cellular and molecular imaging. For example, fluorescent beads have provided a new way in which to produce new assays, e.g., polystyrene beads that enclosed temperature-sensitive fluorophores and fluorescent bead manufactured by coating fluorophores on the outside surface of polystyrene particles. However, the random distribution of dye and high dye to nanoparticle ratio, the fluorescence polarization observed from the beads is low.

Most fluorescent molecules or objects (like quantum dots and fluorescent beads) are indispensible for testing and calibrating instrumentation. In microscopy the typical dyes have problems like photobleaching and/or blinking. Because of that more stable emitter systems like quantum dots or microspheres (beads) are widely used, very stable optically polymer-core nanoparticles with immobilized dyes also proved their utility in studding live biological systems with dynamic flow tracking because of their spectral properties with usually high quantum yield, extinction coefficient and photostability. Nanospheres are widely employed now in the tissue imaging, biotechnology, as temperature sensors and have been used in a variety of applications that include diagnostics and biological assays. However, a high local density of fluorescent molecules enforces a depolarization of observed fluorescence. As a result, these fluorescent nanoparticles cannot be used for studies that utilize polarization methods.

SUMMARY OF THE INVENTION

The present invention provides fluorescence beads having highly polarized fluorescence using photoselective bleaching to create fluorescence beads with highly polarized fluorescence. The beads were immobilized in a PVA polymer and the beads-doped PVA film was exposed to the illumination within the dye absorption band.

The present invention provides a partially fluorescent nanoparticle having a nanoparticle with a matrix and a fluorescent dye dispersed in or about the matrix, wherein at least a portion of the fluorescent dye has been anisotropically bleached. The matrix may be a sphere, bead, nanosphere, microsphere, rod, cube, pyramid, is multisided or is amorphous with a diameter of 5, 10, 15, 20, 25, 30, 40, 50, 60, 70, 80, 90, 100, 150, 200, 250, 500, 750, 1,000, 2,500, 5,000, 7,500 or 10,000 nanometers. The anisotropic bleaching restricts the amount of homo-fluorescence energy transfer within the matrix thereby increasing the fluorescence polarization of the nanoparticle. The nanoparticle may be anisotropically bleached using linearly-polarized, plane-polarized or unpolarized light in any direction. The matrix may be a biocompatible polymer matrix selected from at least one of a solid-matrix polymer or a surface activated polymer (sulfate, aldehyde-sulfate, amine-modified microspheres or biotin- and avidin-labeled nanoparticle) and the dye may be at least one of a UV, a visible, or a near infrared (NIR) emitter. The nanoparticle may be crystal, a crystal structure, a protein crystal, an organometallic salt, an organic liquid crystal, a plastic, a thermoplastic, a biological polymer, an inorganic particle, or a magnetic particle.

The present invention provides a method of making a partially fluorescent nanoparticle by fixing one or more fluorescent nanoparticles in a solid state (highly viscose) matrix (polymer); and exposing the fluorescent nanoparticles to a linearly-polarized, plane-polarized or un-light for a sufficient time to bleach at least part of the fluorescent dyes of the fluorescent nanoparticles along a plane of the light. The plane polarized light is selected to comprise a wavelength that is less than the average diameter of the fluorescent nanoparticles and the linearly-polarized, plane-polarized, or unpolarized light is the obtained by passing light passed through a polarizing filter, is generated by a lamp, an LED, a laser or combinations thereof and may even be a flash of light. Furthermore, the matrix dissolves in water and may also include the step of releasing the beads from the polymer matrix. The present invention also provides an anisotropic fluorescent nanoparticle.

The present invention provides a method of analyzing an anisotropic fluorescence signal by preparing anisotropic nanoparticles; flowing or contacting the nanoparticles under conditions that change the position of the nanoparticles over time; and detecting the change in a signal emitted by the anisotropic nanoparticles. The step of detecting the signal includes a high-throughput screen, an instrument for testing a signal, for calibration; for tissue imaging; on a temperature sensor; or in a diagnostic assay.

BRIEF DESCRIPTION OF THE DRAWINGS

For a more complete understanding of the features and advantages of the present invention, reference is now made to the detailed description of the invention along with the accompanying figures and in which:

FIG. 6A and FIG. 6B are images of the seven emission intensity readings at the peak were determined for the magic angle conditions.

FIG. 7A and FIG. 7B are graphs of the lifetime measurements of 4.12 ns and 4.35 ns for the unbleached and bleached nanoparticles, respectively, display a difference of 0.27 ns.

FIG. 8A and FIG. 8B are graphs comparing the two anisotropy decays reveals that the bleached nanoparticles display higher initial (time zero) anisotropy and higher amplitude of the longest decay component (r03).

FIGS. 14A-14D are graphs of the fluctuation number analysis of the measured fluorescence time traces in unbleached and bleached bead preparations.

FIG. 15A and FIG. 15B are images of the Auto- and cross-correlation functions recorded for the unbleached (FIG. 15A) and bleached (FIG. 15B) nanospheres.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term bead, nanoparticle, nanosphere, nanoparticle bead, microparticle, microsphere, microparticle bead and other variations are used interchangeably unless specifically stated to the contrary to denote a structure that can be a structures with an average diameter of 0.5, 1.0, 2.5, 5, 10, 15, 20, 25, 30, 40, 50, 60, 70, 80, 90, 100, 150, 200, 250, 500, 750, 1,000, 2,500, 5,000, 7,500 or 10,000 nanometers in diameter and may have a structure that is at least partially in the form of a sphere, bead, nanosphere, microsphere, rod, cube, pyramid, is multisided or is amorphous in structure.

Figure 1:
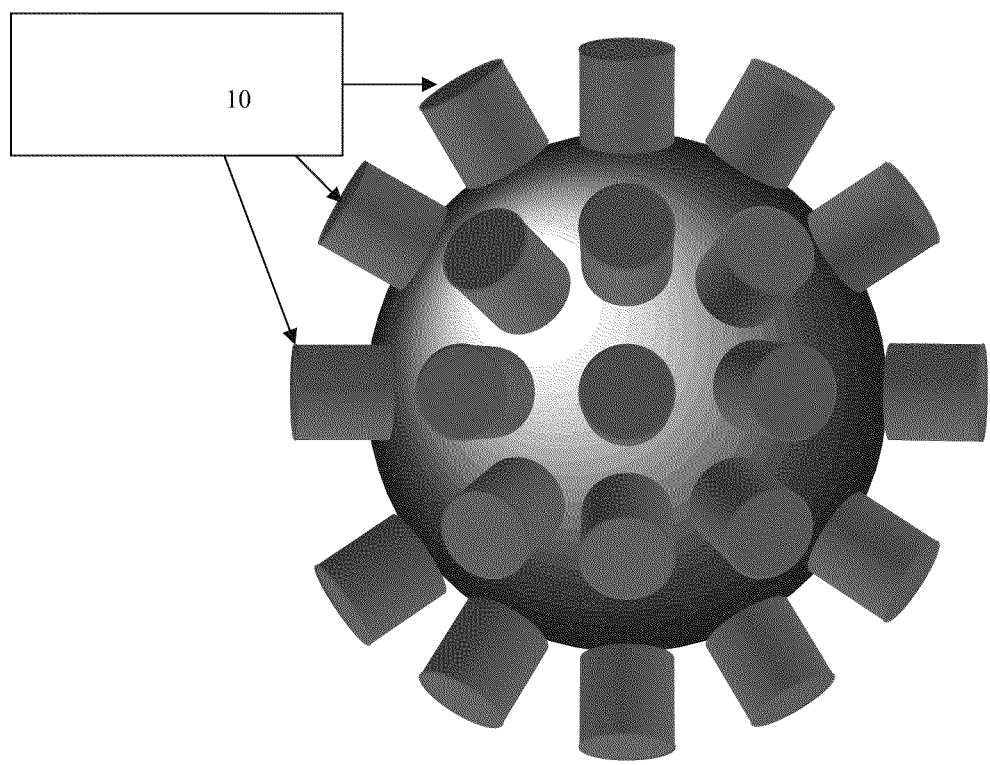
FIG. 1 is a schematic of a fluorescent nanoparticle bead.

The manufacturing of beads that contain only fluorophores oriented in one direction is technologically impossible. However, the present invention provides beads that are photobleached by non-polarized beam of light. FIG. 1 is a schematic of a fluorescent bead. In FIG. 1 the viable fluorophores with various dipole orientations 10 are illustrated and the particle diameter is about 100 nm. As shown in the FIG. 1 this will lead to selective photobleaching of molecules oriented orthogonally to the direction of beam propagation (in exact transition moments oriented orthogonally).

A typical suspension (solution) of beads undergoes fast diffusion (Brownian motion) that quickly reorients the beads. Expose of beads suspension to light will result in uniform bleaching that only results in fluorescence decrease. There two possible approaches: 1. High-energy photobleaching pulses (ns) will photoselectively bleach beads. This is very difficult to realize in practice now. 2. Immobilizing beads in transparent matrix. This is a polymer film where beads are embedded. Typical viscosity of polymer prevents any diffusion of beads and long time weak illumination can be used. After photobleaching (that can be controlled by simple absorption measurements), the polymer can be suspended and beads separated out of solution.

This type of bead design also provides the opportunity to utilize or alter anisotropy values, which, "are based on the principle of photoselective excitation of fluorophores by polarized light." Because fluorophores "preferentially absorb photons whose electric vectors are aligned parallel" to the transition dipoles of the fluorophores, polarized photoselective excitation results in "partially polarized fluorescence emission." More specifically, the "probability of absorption is proportional to the $\cos^2 \theta$, where $\theta$ is the angle the [fluorophore's] absorption dipole makes with the z-axis [(the axis of the exciting photons' propagation)]". The quantitative calculation of anisotropy (r) is defined by:

$$\text{Anisotropy}(r)=(I_{vv}-I_{vh})/(I_{vv}+2I_{vh}) \quad \text{[Eq. 1]}$$

Where Ivv and Ivh are the fluorescence intensities of the vertically and horizontally polarized emissions [(referenced by latter subscript)], when the sample is excited with vertically polarized light [(referenced by initial subscript)]". Thus, even though the theoretical maximum anisotropy seems to be "1" mathematically in the form of equation 1, it is actually "0.4 for collinear absorption and emission dipoles" in solution because of the $\cos^2 \theta$ probability of light absorption. However, because fluorophores in solution can rotate during their "1-10 ns excited-state lifetime, the orientation of the polarized emissions is randomized." As a corollary, fluorophores in more viscous or rigid solutions, or attached to larger masses (i.e. polystyrene beads) will exhibit greater anisotropies because of greater immobility and less affinity to rotate.

In addition, if only selectively oriented fluorophore dipoles on fluorescent beads are allowed to fluoresce, then there should be a characteristically distinct difference in anisotropy between the original beads and the altered beads. Photobleaching is a process where fluorophores lose their ability to fluoresce after being bombarded with too many photons. With polarized photobleaching, it is possible to select certain axial oriented fluorophores to remain, therein altering the native anisotropy of the bead. This difference in anisotropy may provide future useful applications.

The present invention provides polarize fluorescent beads using a selective photobleaching technique; and analyze photophysical properties, including absorption, emission, steady-state anisotropy, lifetimes, and anisotropy decay of the polarized fluorescent beads. The present invention provides selective photobleaching (polarization) to decrease the absorption capabilities but bolster the steady-state, or average, anisotropy of fluorescent beads.

The nanoparticle beads used are of 0.1 μm red fluorescing polymer microspheres containing 1% solids as purchased from Duke Scientific Corp. In creating a matrix to immobilize the beads into set orientations, 80% hydrolyzed, polyvinyl alcohol (PVA) of low molecular weight (9,000-1000 MW) as purchased from Aldrich was used as the solvent. Other minor materials, including hardware and measuring instruments, are discussed throughout the relevant methods.

Immobilizing Nanoparticles in Polymer Matrix and Creating Test Strips. A standard blank PVA solution was prepared using a 125 mL Erlenmeyer flask placed in an improvised 400 mL beaker water bath over a Corning PC 220 hot plate equipped with magnetic stirring rod. PVA beads were added until the solution appeared to be right under the saturation point. The hot plate was left on heating setting "4" and stir setting "3" for two days, after which the PVA solution appeared to be dissolved and homogenous throughout. 15 mL of solution was pipetted into each of two 20 mL glass vials. While fluorescent beads were added to one vial to create a 0.1 μM fluorescent bead solution, the other vial was left intentionally blank (PVA solution only) to act as a control. After manually shaking the vials to ensure even mixture, the solutions were poured into two separate Petri dishes and left in a dark cabinet for five days to dry into PVA films. After the films were dried, box cutter razors were used to cut away the edge of the films from the Petri dishes, and pliers were utilized to peel the films completely off the Petri dishes. A 3 cm×4 cm strip was cut from each film to act as a representative test strip of the respective film as a whole.

Photobleaching and Measuring Absorption Spectra. To determine the optimal photobleaching wavelength, a Cary 50 absorption spectrophotometer was used to measure the absorption spectra of the 0.1 μM test strip while using the PVA film's absorption spectra as the baseline reference sample. The peak of the initial 0.1 μM absorption spectra indicated the preferential wavelength for the process of photobleaching. The 0.1 μM test strip was then placed between two taped coverslips and secured with a lens stand. Using a high intensity 80 mW vertically polarized green laser set at 532 nm, the center of the test strip was illuminated by the laser for 3 hours each in the vertical, horizontal, 45°, and 135° orientations. Furthermore, a mirror was taped behind the target area on the test strip cover slip and an ×10 beam expander was used to both intensify the bleaching process and increase the target area to about 8 mm in diameter.

Figure 2A:
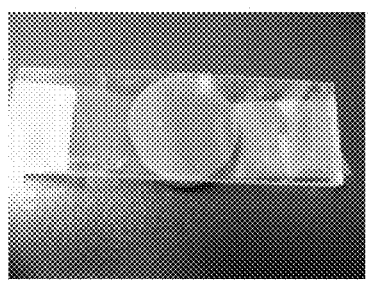
FIG. 2A is an image of the test strip secured between two taped coverslips with mirror attached.
Figure 2B:
FIG. 2B is an image of the test strip during photobleaching process with the target area faintly visible and seen as the white circle in the center of the test strip.
Figure 2C:
FIG. 2C is an overall image of the photobleaching process showing the set-up of the polarized green laser in relation to the test strip held by the lens holder.

FIG. 2A is an image of the 3 cm×4 cm 0.1 μM test strip secured between two taped coverslips with mirror attached. FIG. 2B is an image of the test strip during photobleaching process with the target area faintly visible and seen as the white circle in the center of the test strip. "Side sections" of strip remain unbleached. FIG. 2C is an overall image of the photobleaching process showing the set-up of the polarized green laser in relation to the test strip held by the lens holder. Distance of the laser from the strip was adjusted until the white target area seen in FIG. 2B was about 8 mm in diameter.

Figure 3A:
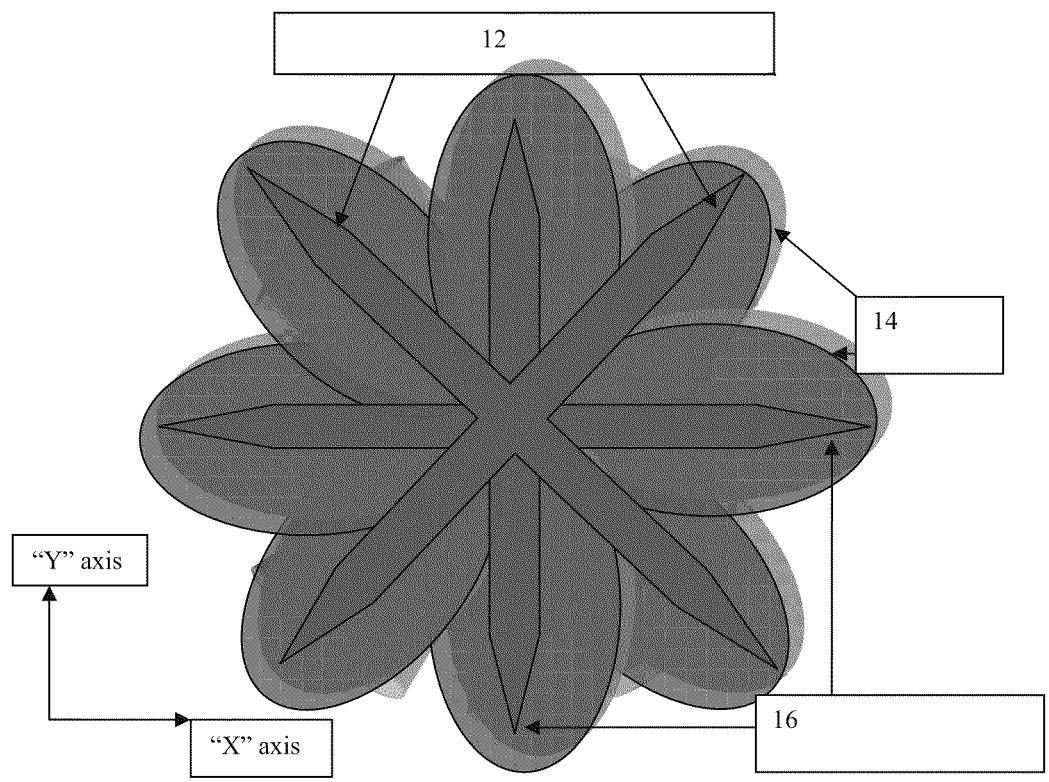
FIG. 3A is an image of the front view of the schematic of selective photobleaching on a single bead.
Figure 3B:
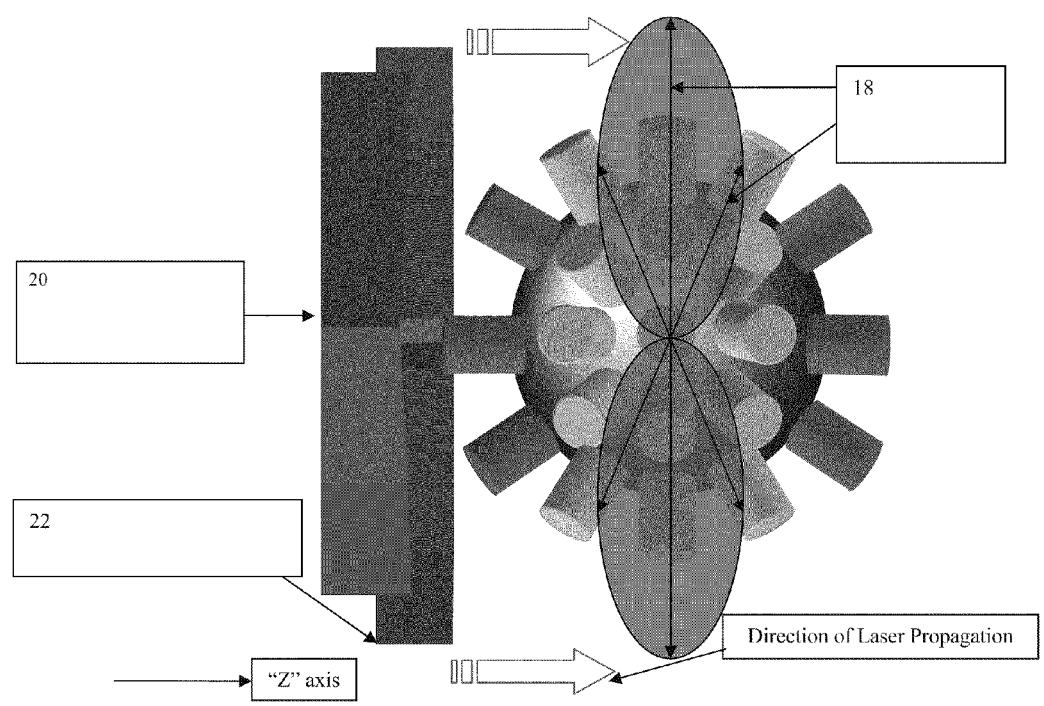
FIG. 3B is an image of the right side view schematic of selective photobleaching on a single bead.
Figure 12:
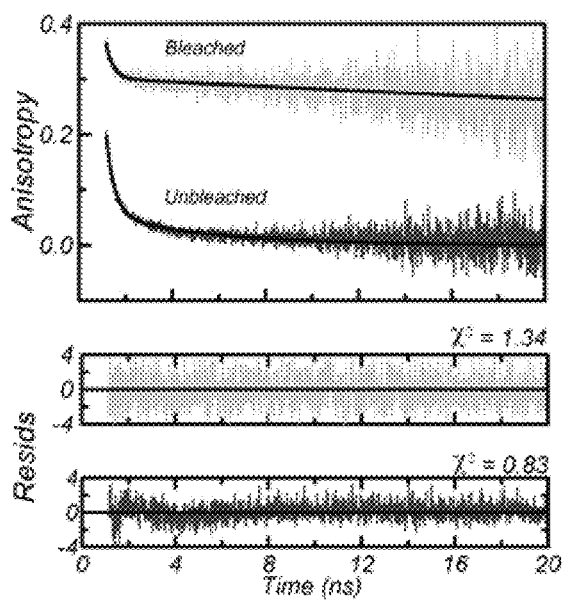
FIG. 12 is a graph of the anisotropy decays of the bleached and unbleached nanospheres.

FIG. 3A is an image of the front view of the schematic of selective photobleaching on a single bead. As seen in FIG. 3A 12 is the polarized laser emissions at 45° and 135° 14 is the $Cos^2$ excitation and 16 is the polarized laser emissions at 90° and 180°. FIG. 3B is an image of the right side view schematic of selective photobleaching on a single bead. As seen in FIG. 3B 18 is the $Cos^2$ excitation dipoles, 20 is the polarized laser emissions at 45° 135° and 22 polarized laser emissions 90° and 180°

These methods worked to ensure full photobleaching in the test strip's focal ("x,y") plane by the montage of the respective cost excitation patterns and the fact that only the fluorophores whose excitation dipoles were oriented in the direction of laser propagation ("z" axis plane of the beads) remained capable of fluorescence. As an initial check, the absorption spectra of the bleached and unbleached portions of the 0.1 μM strip were measured after 2 and 3 hours of vertical illumination to affirm that the phenomenon of photobleaching was actually occurring. After the full 12 hours of photobleaching (3 hours from each orientation), the absorption spectra of the test strips were measured again.

Figure 4A:
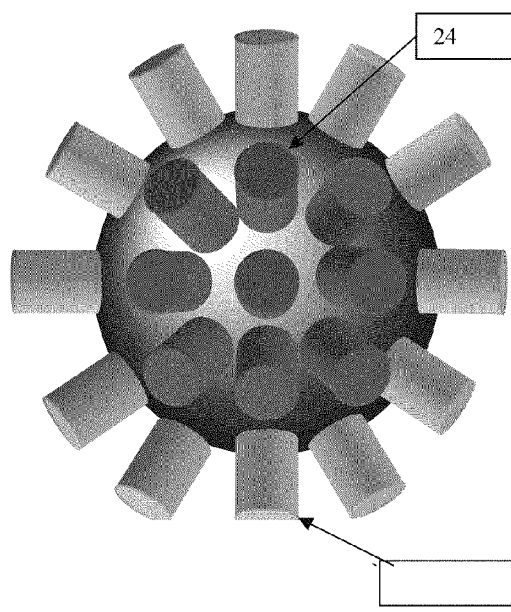
FIG. 4A is an image of a front view of polarized fluorescent nanoparticle bead.
Figure 4B:
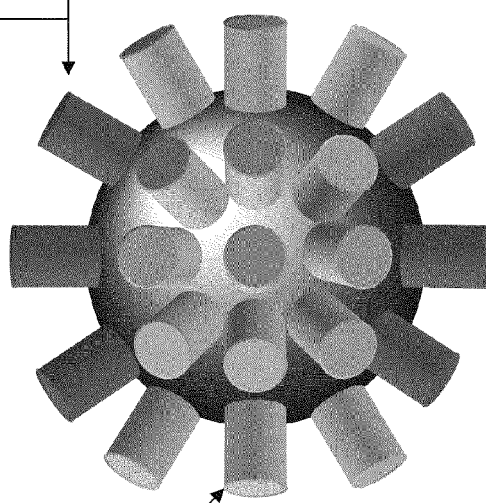
FIG. 4B is an image of a side view of polarized fluorescent bead.

FIG. 4A is an image of a front view of polarized fluorescent nanoparticle bead and FIG. 4B is an image of a side view of polarized fluorescent bead where 24 is the Viable fluorophores and 26 is the Photobleached fluorophores.

Releasing the polarized beads into solution. With the affirmation of photobleaching, equal fragments (0.0130 g) from the PVA strip, the bleached center of the 0.1 μM strip and the unbleached side section of the 0.1 μM strip were obtained using a box cutting razor and a Mettler Toledo AL54 mass scale. These three fragments were each placed in separate 4 ml vials and dissolved in 2 ml of distilled water. To facilitate this process, an alternating regimen of 2 hours on the hot plate at heat setting "2" and 5 minutes in a sonicator was used. Still, it took a total of 23 hours for the fragments to dissolve completely into solution. Measuring photophysical properties of polarized beads in solution. Using a suction pipet, the dissolved solutions were transferred from the three vials to three 4 mm beam-width quartz cuvettes. The absorption spectra were measured again, followed by emission spectra on the Varian Eclipse spectrophotometer equipped with excitation and emission polarizers. First, the total emission intensity (isotropic equivalent) readings were achieved through the magic-angle conditions (excitation polarizer—vertically polarized, emission polarizer—54.7° polarized; VMA). Then, the instrumental G factor parameters were measured (intensity HH and intensity HV; HH referring to horizontal polarization for both excitation and observation polarizers and HV referring to horizontal polarization on excitation polarizer and vertical polarization on observation polarizer). After these steps, the VV and VH intensities were measured. For all of the above measurements, the blank PVA solution was used as the baseline, the excitation wavelength was set at 530 nm, and the spectrophotometer recorded emission intensities at medium speed from 560 nm to 700 nm in CAT scan mode set to recover the average emission spectra of 5 successive scans (see FIGS. 6A, B). Using the peak wavelengths corresponding to the seven peak intensity readings from the magic angle conditions, the average HH, HV, VV, and VH intensity measurements were deduced and used in the anisotropy equation to calculate anisotropy (see Table 1). Finally, the Picoquant Fluorometer FT200 was used to measure average fluorescent lifetimes over 30 ns and the anisotropy decays. Furthermore, the fluorometer was also able to detect steady state anisotropies, thus providing an extra way to confirm the previous observations from the Varian Eclipse spectrophotometer.

Figure 5A:
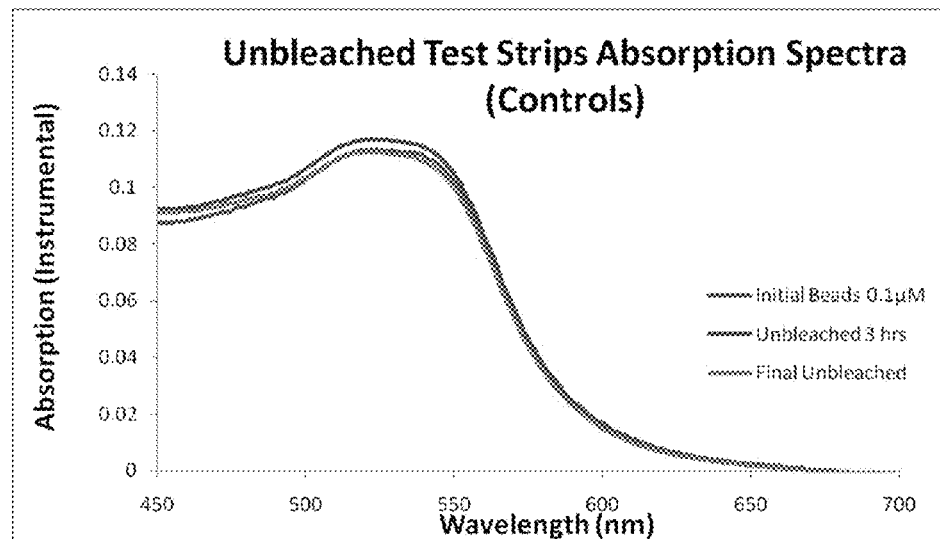
FIGS. 5A-5B are spectrums showing noticeable drops in fluorescence absorption occur with longer photobleaching times while unbleached absorption spectra tend to hover steady, thus indicating minimal loss in fluorescence viability for unaltered fluorescent beads.
Figure 5B:
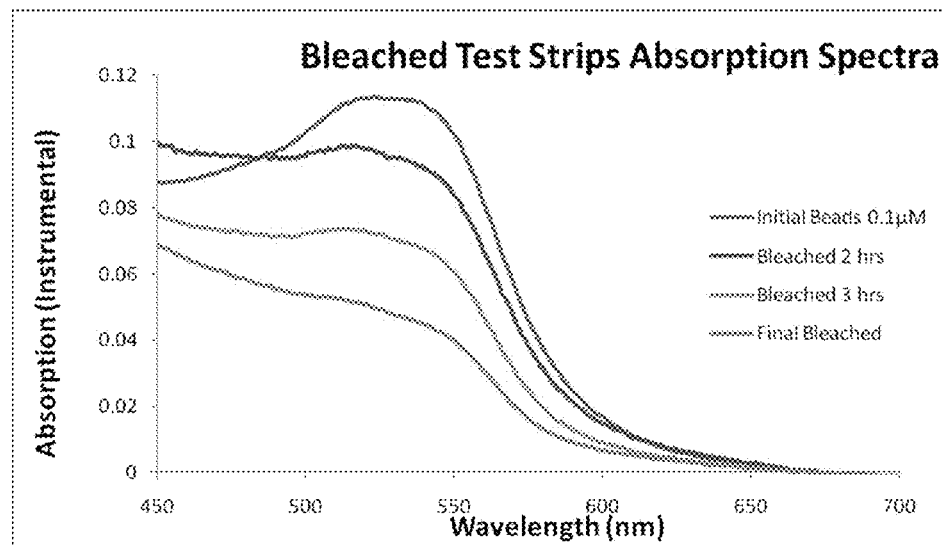
Figure 5C:
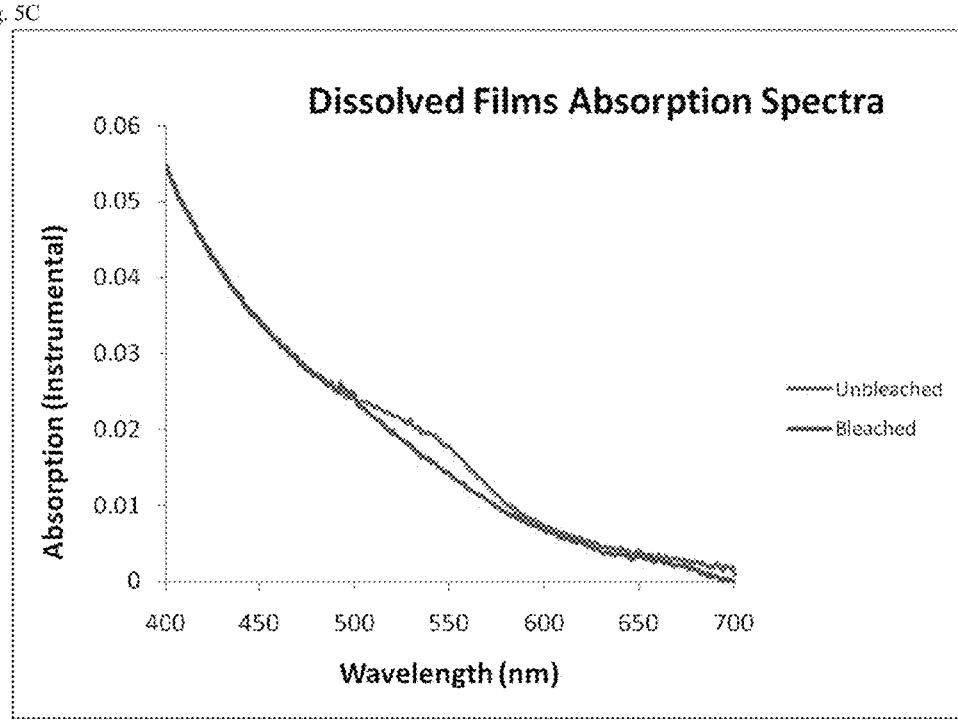
FIG. 5C is a graph of the bleached film's dissolved solution displays very weak absorption, there is still a discernible absorption peak for the unbleached film's solution.

FIGS. 5A-5B are spectrums showing noticeable drops in fluorescence absorption occur with longer photobleaching times while unbleached absorption spectra tend to hover steady, thus indicating minimal loss in fluorescence viability for unaltered fluorescent beads. Peak values ~530-534 nm. PVA test strip used as the baseline. FIG. 5C is a graph of the bleached film's dissolved solution the bleached film's dissolved solution displays very weak absorption, there is still a discernible absorption peak for the unbleached film's solution. The reason for such a small peak lies in the small concentration of beads used for the solutions. Nonetheless, this still affirms that photobleaching did indeed occur in the target area. PVA solution used as a baseline.

Longer photobleaching times yield lower absorption measurements. This happens because of a decrease in number of viable fluorophores because of photobleaching. This phenomenon is confirmed by the fact that the unbleached portion of the test strip returns an absorption rate that stays nearly the same throughout the entire bleaching process. Even when the beads are dissolved in solution, the unbleached solution exhibits noticeable absorption while the bleached solution does not.

Figure 6A:
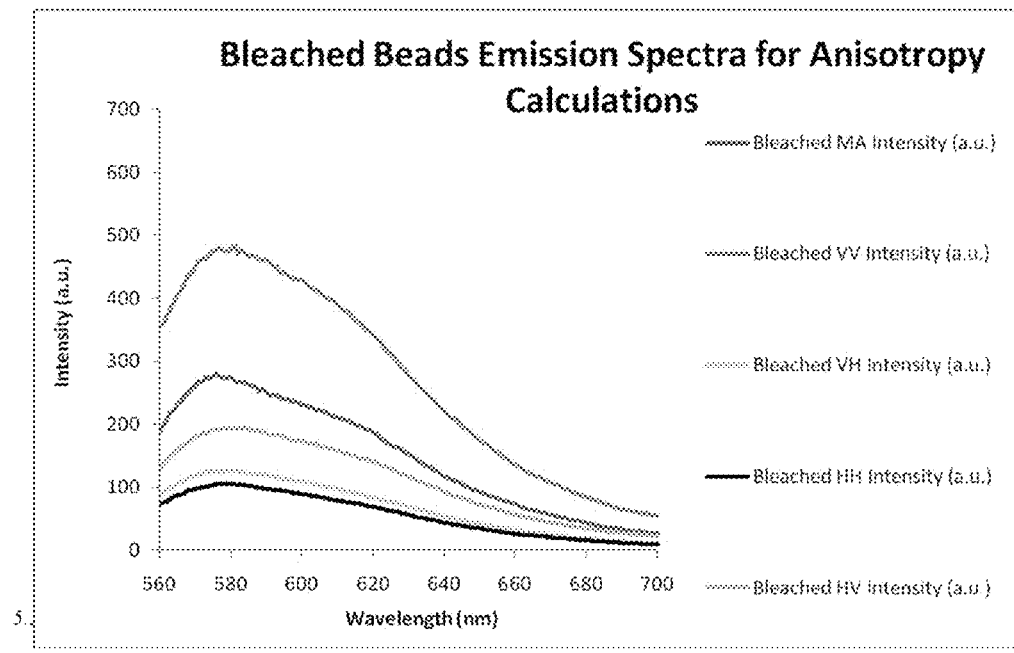

Emission and Anisotropy Values Observed from Dissolved Films. FIGS. 6A and 6B are images of the seven emission intensity readings at the peak were determined for the magic angle (MA) conditions. Wavelengths used were cross-referenced to the seven readings of the HH, HV, VV, and VH intensities. These values were then averaged and used to calculate the anisotropy for both the bleached and unbleached film solutions. PVA solution used as the baseline on both spectra.

Equation 1 is modified to include an instrumental factor when calculating steady-state anisotropy.

$$\text{Anisotropy}(r) = (I_{vv} - GI_{vh})/(I_{vv} + 2GI_{vh}) \quad [\text{Eq.2}]$$

where, $$G(\text{instrumental factor}) = I_{HV}/I_{HH} \quad [\text{Eq.3}]$$

Table 1 below is a steady-state anisotropies of fluorescent beads with and without photobleaching. The solutions used are from the dissolved films.

|  | G factor | Average $I_{VV}$ | Average $I_{VH}$ | Anisotropy |
|---|---|---|---|---|
| Unbleached | 1.91 | 885.7 | 288.0 | 0.169 |
| Bleached | 1.83 | 473.0 | 125.4 | 0.261 |

FIGS. 7A and 7B are graphs of the lifetime measurements of 4.12 ns and 4.35 ns for the unbleached and bleached nanoparticles, respectively, display a difference of 0.27 ns. One reason for the longer average lifetime for the bleached nanoparticles is a lessening of homo-resonance energy transfer between fluorophores that the total fluorophore population is markedly lower than that of the unbleached beads.

Anisotropy Decays. FIGS. 8A and 8B are graphs comparing the two anisotropy decays reveals that the bleached nanoparticles display higher initial (time zero) anisotropy and higher amplitude of the longest decay component ($r_{03}$). These higher components pull up the overall average, or steady-state value, of the anisotropy for the bleached nanoparticles.

The results of the photophysical measurements provide a way to assess both the occurrence and extensiveness of fluorescent nanoparticle polarization after using a selective photobleaching process. As shown in FIG. 5B, the absorption spectra of the beads while immobilized in a polymer matrix decreases progressively with the time of photobleaching. This photobleaching process preferentially bleaches certain fluorophores along their transition moments. However, photobleaching does not occur in the direction of the propagation of the light beam. Therefore, even after extensive bleaching, there is a fraction of unbleached fluorophores with their dipoles aligned along the direction of light propagation (FIGS. 4A, B). As the transition moments of the fluorescent molecules on the beads are not distributed evenly, the beads become polarized. This is confirmed by the calculated anisotropies in FIG. 6 and Table 1. The fluorescence anisotropy difference was 0.092 between the bleached and unbleached beads, thus implying a significant 54.4% increase in fluorescence anisotropy arising from the use of selective laser photobleaching.

The purpose of this experiment was to polarize successfully fluorescent nanoparticles and to analyze the ensuing differences in their photophysical properties. The present invention provides the immobilization of fluorescent beads in PVA polymer matrix, selective photobleaching through various polarizations of laser light illumination, dissolution of bleached and unbleached polymers in distilled water, measuring of photophysical properties of polarized beads.

With observed differences in absorption, emission, anisotropy and lifetimes, the attention now shifts to how these differences in photophysical properties can be applied. Polarization-based anisotropy measurements have many advantages in spectroscopy and microscopy. Ratiometric in nature, anisotropy assays are not heavily dependent on the full intensity (isotropic properties) of fluorescence. Therefore, anisotropy measurements can be recovered even in the presence of weak fluorescence emission. Anisotropy-based imaging can make great use of this ratiometric phenomenon. For example, the Foster Research Group at the University of Rochester Medical Center has developed a "technique for imaging enzyme activity that is based on fluorescence anisotropy measurements". Since attaching fluorescent probes to substrates increases the anisotropies of probe-protein complexes due to less affinity to rotate during the fluorescence lifetime, substrate processing by the enzyme can be seen through differences in time-delayed image sequences, or spatiotemporal maps, of anisotropy measurements. With an increase in anisotropy of the fluorescent probes themselves, a greater resolution of this spatiotemporal mapping is possible. Through the development of a broader knowledge base concerning the photophysical properties of differing fluorescent bead varieties, further studies will be able to observe more enzymes at a time. Thus, a possible application of polarized fluorescent bead technology includes studying the activities of various enzymes during a cell's normal homeostatic state through the lenses of anisotropy measurements. Another possible application is the study of cell cytosol viscosity using, among others, the Perrin equation, which relates anisotropy measurements to molecular rotational correlation times. However, these applications would require more in-depth study of how the polarized beads interact with various pH and ionic conditions.

Furthermore, the production of polarized fluorescent beads is not too terribly complicated. This ease of manufacturing is compounded with the fact that the entire process can also be precisely controlled. With discretion in adjusting the amount of photobleaching time and selectivity in determining how many different orientations in which to bleach with a polarized laser, users of polarized fluorescent nanoparticle technology possess the power to produce nuanced and customized beads to fit their own particular needs. As the importance of nano-scale imaging increases during the current revolution of bio-molecular research, advances in the understanding and production of polarized fluorescent beads with specific photophysical properties contain the potential to enhance a diverse field of future applications.

The present invention provides emission polarization and/or anisotropy. The usefulness of this method relies on ratiometric intensities measurements of two orthogonally polarized fluorescence signals following polarized excitation of the sample. In addition to the requirements of maintaining proper polarization conditions in a polarization microscope, there is a need for extended molecule observation time. A handful of researchers have already demonstrated that application of de-oxygenating compounds can prolong the time of fluorophore observation. Alternatively, more stable emitter systems like quantum dots or microspheres (beads) can be used. The polymer-core nanoparticles with immobilized dyes proved their utility in studding live biological systems with dynamic flow tracking because of their spectral properties with usually high quantum yield, extinction coefficient and photostability. Nanospheres are widely employed now in the tissue imaging, biotechnology, as temperature sensors and have been used in a variety of applications that include diagnostics and biological assays. However, a high local density of fluorescent molecules enforces a depolarization of observed fluorescence. As a result, these fluorescent nanoparticles cannot be studied using polarization methods.

The present invention provides a method for preparation of highly polarized fluorescence beads. The photoselective bleaching eliminates fluorophores with transition moments along the electric vector of impinging light. The molecules with transition moments oriented along the direction of propagation of the light (perpendicular to the electric vector) are not excited and not photobleached. In effect, after sufficient photobleaching the fluorescent beads are highly polarized. To accomplish this goal we bleached fluorescent beads-doped PVA film with not polarized intensive light and dissolve later from polymer matrix into solution. We employed the steady state anisotropy, anisotropy decay and polarized Fluorescence Cross Correlation Spectroscopy (FCCS), which are the methods sensitive to the orientation of the transition dipole moment of the molecule and allow determining its changes under molecule movements.

Dark red fluorescent (660/680 nm) carboxylate modified microspheres (nanoparticles, beads) 0.02 µm in diameter (lot: 426844) were from Invitrogen (Eugene, Oreg., USA). Low molecular weight ($M_w$ 9,000-10,000 g/mol) PVA (polyvinyl alcohol) was purchased from Sigma-Aldrich (St. Louis, Mo., USA). Triton X-100 reduced form applied in 1% concentration of total amount of solution was obtained from Fluka (93424). Water used in all the experiments was deionized made up using a Milli-Q Synthesis A10 system produced by Millipore.

Sample preparation for optical studies. Fluorescence microspheres were fixed in 30% PVA film. PVA aqueous solution was prepared using standard method by dissolving the powder in water heated to about 100° C. under stirring. The mixture of nanospheres with PVA were poured to Petrie dishes and left for drying. Then, we measured absorption spectra of the fluorescent nanospheres-doped PVA film. The PVA strip without nanospheres was used as a reference. Absorption spectra were recorded for beads before and after progressive photobleaching.

Next, we dissolved the same amount of bleached and not bleached films in deionized water (0.025 g/1 ml) and after addition of 1% of Triton X and 10 min. sonication (to avoid aggregation of the beads) used these two samples for spectroscopic measurements. FSC experiment was performed for the adequately diluted samples.

Steady-state measurements. The absorption spectra of red fluorescent beads were measured using a single beam Cary 50 Bio spectrometer (Varian Inc., Australia). The emission spectra of beads in the water were measured using Varian Cary Eclipse spectrofluorometer with excitation of 635 nm. The spectrofluorometer was equipped with polarizer; (Manual Polarizer Accessory, Varian Inc., Australia) adjusted to proper positions for excitation and emission paths. We observed a remarkably high stability of dissolved photobleached nanospheres stored in the refrigerator at 4° C. One month after the preparation, they still showed the same intensity and anisotropy. Time-resolved measurements. Fluorescence decays and anisotropy study were performed using time-domain method implemented in FluoTime200 (PicoQuant GmbH, Berlin, Germany) equipped with a Hamamatsu microchannel plate detector (MCP). The emission monochromator was at 685 nm and the Glan-Tylor polarizer was set to the proper conditions under measurements. For all the studies we were using long pass wavelength glass filter 665 nm. The excitation source was a 635 nm pulsed laser diode driven by a PDL800 driver (PicoQuant GmbH, Berlin, Germany). Time-resolved fluorescence data were analyzed using the FluoFit software package (version 4.2.1, PicoQuant GmbH). Fluorescence intensity decay data were fitted by the iterative convolution to the sum of exponents:

$$I(t) = \sum_i \alpha_i \exp(-t/\tau_i) \tag{Eq. 4}$$

where $\alpha_i$ and $\tau_i$ are the pre-exponential factor and fluorescence lifetime, respectively.

For anisotropy study, two fluorescence intensity decays were measured: $I\|(t)$ and $I^\perp(t)$ for each sample solutions with either oriented or isotropic dyes in the beads. Relative to the vertical laser light polarization analyzing polarizer was set to vertical and horizontal orientation, respectively. From these decays, the anisotropy as a function of time was determined:

$$r(t) = \frac{I_{\|}(t) - GI_{\perp}(t)}{I_{\|}(t) + 2GI_{\perp}(t)} \tag{Eq. 5}$$

where G is a correction factor (G-factor) compensating instrument sensitivity difference for vertically and horizontally polarized light. In our study, G-factor was measured by standard procedure using Cresyl Violet in methanol as a reference with near zero anisotropy. The anisotropy decay data were fitted to the multiexponential function:

$$r(t) = \sum_{i=1}^{n} R_i e^{-\frac{t}{\phi_i}} \tag{Eq. 6}$$

where Ri is an initial anisotropy contribution of the i-th component in the fitting range channel and θi is a rotational correlation time of the i-th component.

FCS (microscopy) measurements. The FCS (Fluorescence Correlation Spectroscopy) measurements were performed with MicroTime 200 (Picoquant GmbH, Berlin Germany), a time-resolved fluorescence microscope. As a source of light we used 635 pulsed diode laser (LDH-P-C-635B) driven by PDL 828 (Picoquant GmbH, Berlin, Germany) driver and operated at 20 MHz repetition rate. Excitation was pre-cleaned (Chroma Technology bandpass filter z636/10x) and via single mode fiber optics coupled to the optical module. The excitation was naturally, linearly polarized from laser but additional horizontal polarizer was applied. After that, light was sent to the side port of Olympus IX71 inverted microscope and focused 10 μm above the coverslip (Menzel-Glaser #1) inside a sample drop volume. We used Olympus UPlan-SApo 60× magnification water objective, NA=1.2 to focus the excitation light and gather fluorescence. For the emission detection, a 647 razor long wavelength pass filter (Semrock LP02-647RS) was applied blocking the excitation light. Confocal type of measurements was achieved with 30 μm pinhole. For the purpose of suppression after pulsing influence effects typically observed with single photon avalanche photo-diodes, the Fluorescence Lifetime Correlation Spectroscopy was adopted to analyze the autocorrelation of the time trace of fluorescence. The fluorescence light was split with polarizing beam splitter that splits light into orthogonal components detected by two identical Micro Photon Devices (PDM 1CTC) Avalanche Photo Diodes. Photon stream was collected by PicoHarp300 time-correlated single-photon counting module and data analysis (correlation) was performed with SymPhoTime (v. 4.7.2.1) software (Picoquant GmbH, Berlin, Germany). The experiments were typically performed with a laser power of 2 μW in a focus.

Self similarity of the fluorescence fluctuation signal received form nanoparticle freely diffusing in the confocal volume can be extracted using autocorrelation analysis. The normalized fluorescence correlation function is defined by the following mathematical function:

$$G_{kl}(\tau) = \frac{\langle \delta I_k(t) \delta I_l(t+\tau) \rangle}{\langle \delta I_k(t) \rangle \langle \delta I_l(t+\tau) \rangle} \quad \text{(Eq. 7)}$$

Where $\delta I(t)$ and $\delta I(t+\tau)$ are the fluorescence intensity fluctuations from the mean at time τ and t+τ, respectively. The indices i and j refer to different detectors and for autocorrelation function k=l. Auto- and cross-correlation curves due to translational diffusion through 3-dimentional Gaussian shaped volume were fitted with following expression:

$$G(\tau) = \sum_{i=1}^{n} \rho_i \left(1 + \frac{\tau}{\tau_{Di}}\right)^{-1} \left(1 + \frac{\tau}{\tau_{Di}\kappa^2}\right)^{-1/2} \quad \text{(Eq. 8)}$$

where ρi is a contribution of i-th diffusion species for total autocorrelation function, τDi is a diffusion time of i-th diffusion species, κ is length (zo) to diameter (wo) of the focal volume. The confocal volume parameters (zo and wo) for objective and used wavelength was determined before FCS experiments using a standard method with scanning subresolution fluorescence beads. The achieved average values for κ was 3.1. Based on the geometrical conditions and fit to the cross- and autocorrelation functions (in our experiment both for bleached and unbleached nanospheres we received one component fit), we determined diffusion coefficient D via:

$$D = \frac{w_o^2}{4\tau_D} \quad \text{(Eq. 9)}$$

Absorption and fluorescence of nanospheres-doped PVA films. The aqueous PVA solution containing red nanospheres was dried in Petrie dish at room temperature for four days. For spectral measurements a strip 15 mm×30 mm, about half mm thick, was cut from the center of the film. FIG. 1 presents the absorption spectra of the 24 nm fluorescent beads immobilized in PVA film and progressively exposed to the unpolarized light from fiber optic illuminator (Oriel, model 77501).

Figure 9:
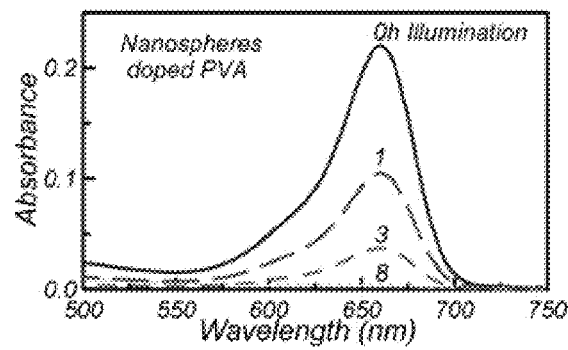
FIG. 9 is a graph of the absorption spectra recorded for 24 nm beads before (continuous) and after (dashed) progressive bleaching.

FIG. 9 is a graph of the absorption spectra recorded for 24 nm beads before (continuous) and after (dashed) progressive bleaching. After 8 hours photobleaching, the absorption decreased about 20 fold. The 10 mm light guide from the illuminator was attached to the center of the strip. The bleached area was used for absorption and fluorescence measurements. The absorption intensity decreased with the time substantially. Fluorescence (not shown) decreased proportionally to the absorption. After 8 hours exposure to the light both, absorption and fluorescence signals decreases about 20 fold. We noticed that absorption increased when the strip was tilted. Molecules with transition moments in the plane of the strip were substantially eliminated and molecules with perpendicular transition moments remain in the sample.

Figures 10A, 10B:
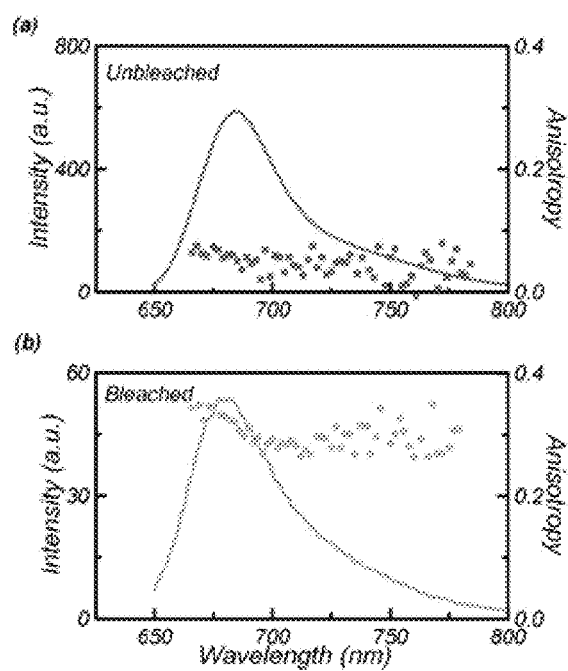
FIG. 10A and FIG. 10B show steady-state anisotropies for both samples after dissolving in water.

Steady-State Fluorescence of Dissolved Nanospheres. Next, we dissolved in 1 ml of water 25 mg of both, bleached and unbleached portions of the PVA strip. We observed fluorescence from the sample of bleached area, which had no emission in the film. An oriented bead system is a suitable model to carry out studies on the fluorescence anisotropy. For this purpose, beads embedded in the PVA films were dissolved in water. FIG. 10 is an image that presents emission spectra of the unbleached (FIG. 10A) and photobleached (FIG. 10B) beads recorded with the magic angle direction to the polarization of the electric vector of exciting light. The observed spectra are similar for both, bleached and unbleached samples. We note that the intensity of the sample containing bleached nanospheres was only 10 fold smaller than for unbleached sample (compare top and bottom). FIG. 10 illustrates the emission spectra recorded for unbleached (top) and bleached (bottom) fluorescent nanospheres using 635 nm excitation wavelength (continuous lines). Squares (top) and dots (bottom) present anisotropy data. The steady-state anisotropy is significantly higher for bleached nanospheres.

Figure 11:
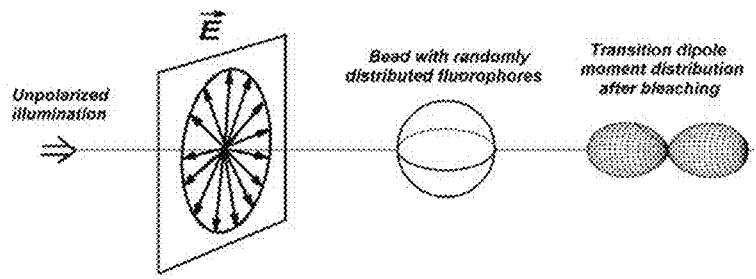
FIG. 11 is a schematic diagram for formation of the oriented transition dipole moment distribution in the fluorescence nanospheres (formation of polarized fluorescent nanospheres).

FIG. 10 shows also steady-state anisotropies for both samples after dissolving in water. Very low anisotropy was observed for unbleached sample (top) and very high, close to the limiting value of 0.4, for bleached (bottom). Before the bleaching, transition dipole moments are symmetrically distributed around the axis of light propagation. The formation of anisotropic distribution of transition moments in the bleached nanospheres is presented in FIG. 11. FIG. 11 is a schematic diagram for formation of the oriented transition dipole moment distribution in the fluorescence nanospheres (formation of polarized fluorescent nanospheres). Non-polarized light interacts with fluorophore-labeled nanospheres immobilized in the polymer. This interaction results in photodestruction of the dye molecules with dipole moments aligned in the plane of the polymer. Transition dipole moments (dyes) which left after photobleaching lie along the axis of the light propagation. These molecules were not excited in the process of photobleaching.

Time-Resolved Measurements of Dissolved Nanospheres. The first step in quantitative measurements of orientation is to determine whether the probe posses distinct polarization so that the transition dipole moment of the fluorophore reflects the orientation of the bead. FIG. 4 shows the anisotropy decays of unbleached and bleached nanospheres. FIG. 12 is a graph of the anisotropy decays of the bleached and unbleached nanospheres. Bottom panels show residuals for the least square fits. The goodness of fit is reflected by the value of $\chi^2$ given above. Excitation was 635 nm, and emission was observed at 685 nm with a long wave pass (LWP) filter >665 nm.

In the case of unbleached sample, two correlation times are recovered, 4.46 ns and 0.35 ns with associated anisotropies 0.05 and 0.15, respectively (Table 2). The same figure (FIG. 12 light line) shows the decay of anisotropy of bleached nanospheres. Table 2. Fluorescence anisotropy decay parameters of the beads treated and not treated by light in aqueous solution ($\lambda_{exc.}$=635 nm, $\lambda_{obs.}$=685 nm).

| Sample | $R_1$ | $\Phi_1$ [ns] | $R_2$ | $\Phi_2$ [ns] | $X_R^2$ |
|---|---|---|---|---|---|
| Not bleached nanospheres | 0.15 | 0.35 | 0.05 | 4.46 | 0.83 |
| Bleached nanospheres | 0.06 | 0.31 | 0.30 | 140.1 | 1.34 |

$$r(t) = \sum_{i=1}^{n} R_i e^{-\frac{t}{\phi_i}},$$

where $\theta_i$ are correlation times and $R_i$ are associated amplitudes (anisotropes).

The anisotropy decay can be fitted with two exponents with correlation times of 140.1, and 0.3 ns, and associated anisotropies of 0.31 and 0.06, respectively. The anisotropy associated with the longer correlation times increased significantly upon photobleaching. We conclude that polarized nanospheres are good for monitoring the anisotropy.

Figure 13:
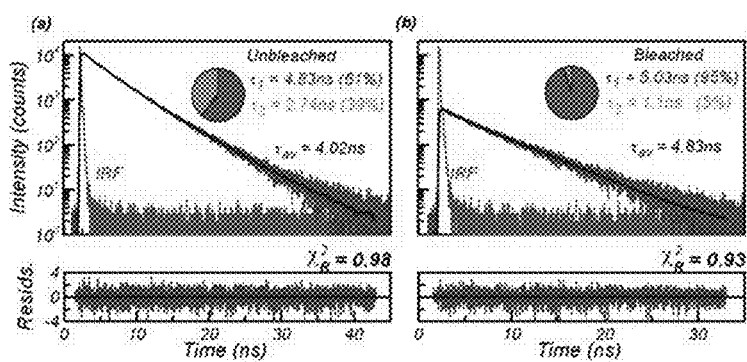
FIG. 13A and FIG. 13B are intensity decays of fluorescence of unbleached (FIG. 13A) and bleached (FIG. 13B) nanospheres.

FIGS. 13A and 13B are intensity decays of fluorescence of unbleached (13A) and bleached (13B) nanospheres. Black line: best two exponent fits. Bottom panels: residuals. Data collected using 635 nm excitation from a pulsed solid state laser, emission was observed at 685 nm with LWP665 filter.

Next, we measured lifetimes of unbleached and bleached nanospheres. The intensity decays are presented in FIG. 5 and decay parameters are summarized in Table 3. Analysis of the fluorescence decays for untreated beads resulted in the fluorescence lifetimes of 4.83 ns ($\alpha_1$=47%) and 2.74 ns ($\alpha_2$=53%) yielding an (amplitude-weighted) average fluorescence lifetime $<\tau>$=3.73 ns. The light treatment (photobleaching) yielded fluorescence lifetime components 5.03 ns ($\alpha_1$=80%) and 1.1 ns ($\alpha_2$=20%) resulting in increase of the average lifetime to $<\tau>$=4.26 ns. Table 3. Fluorescence lifetimes of the beads bleached and not bleached in aqueous solution measured under magic angle conditions ($\lambda_{exc.}$=635 nm, $\lambda_{obs.}$=685 nm).

| Sample | $\alpha_1$ | $\tau_1$ [ns] | $\alpha_2$ | $\tau_2$ [ns] | $\bar{\tau}^a$ [ns] | $<\tau>^b$ [ns] | $X_R^2$ |
|---|---|---|---|---|---|---|---|
| Not bleached nanospheres | 0.53 | 2.74 | 0.47 | 4.83 | 4.02 | 3.73 | 0.98 |
| Bleached nanospheres | 0.2 | 1.1 | 0.8 | 5.03 | 4.83 | 4.26 | 0.93 |

$$^a\bar{\tau} = \sum_i f_i \tau_i, f_i = \frac{\alpha_i \tau_i}{\sum_i \alpha_i \tau_i}$$

$$^b\langle\tau\rangle = \sum_i \alpha_i \tau_i$$

We realized that in the photobleaching process many dye molecules were eliminated as shown in FIG. 14.

FIGS. 14A-14D are graphs of the fluctuation number analysis of the measured fluorescence time traces in unbleached and bleached bead preparations. The total numbers of measured fluctuations above the background level of 5000 Hz were in (FIG. 14A): 716, in (FIG. 14B): 210 and in (FIG. 14C): 514, in (FIG. 14D): The measurement times were 600 s. This reduces an excitation energy migration (homo transfer) between dyes and possible quenching. In unbleached nanospheres, the fluorescence of the red dye is partially self-quenched. This finding is important because longer lifetime is preferred in anisotropy measurements.

3.4 Fluorescence Correlation Spectroscopy Measurements of Dissolved Nanospheres. We examined mobility of the fluorescent nanospheres by means of Fluorescence Lifetime Correlation Spectroscopy (FLCS), which measures intensity fluctuations of the fluorophores diffusing through a small confocal volume and analyzing them simultaneously with lifetime of the samples. In FLCS data acquisition, the excitation is pulsed and two independent timings are performed for every detected photon. We used FLCS method because typical autocorrelation function recorded with one APD detector contains after pulsing time constant of the order of a few hundred nanoseconds, which make it difficult to recognize residue from rotational correlation effects. In this setup, the fluorescence light was split into two parts by polarizer cube and directed to two detectors in order to extract translational diffusion and to measure part of rotational correlation curve from those data as well.

FIG. 15A is a graph that shows the measured auto- and cross-correlation functions for unbleached nanospheres. Autocorrelation functions for detectors that recorded polarized emission perpendicularly and in parallel to the excitation light are presented with green and blue lines, respectively. A cross-correlation of the experimental signals from two polarizations is presented with black circles and a red line (fit). We recovered comparable values of diffusion coefficients D from auto- and cross correlation in one component fits with D=15 µm²/s. The diffusion time was $\tau_D$=2.6 ms. The translational diffusion coefficient obtained experimentally was very well related to the Stokes-Einstein relationship D=kT/6πηr, where k is the Boltzmann constant, T the absolute room temperature, η the solution (water) viscosity, and r the hydrodynamic radius of the microspheres. From calculations, we expected D=18.1 µm²/s. We did not found equal amplitudes of autocorrelation functions (which are reversely related to the concentration of the sample) because of photoselection effect obtained using polarized excitation light. The larger amplitude of autocorrelation function corresponds to the detector that recorded polarized emission perpendicularly (green line) to the excitation and the lower amplitude value to the parallel polarization (blue line).

FIG. 15B is a graph that shows data obtained by auto- and crosscorrelation functions using horizontally polarized light of excitation applied for bleached beads. The bleach bead preparation studied was identically to the one described in the above experiment. Under those conditions, single channel analysis received for both the detectors that recorded either polarized emission perpendicularly (green) or in parallel (blue) to the excitation shows the same gain of the autocorrelation function amplitude in the range of delay times of about $10^{-4}$-$10^{-3}$ ms.

FIG. 15 are images of the Auto- and crosscorrelation functions recorded for the unbleached (a) and bleached (b) nanospheres. Autocorrelation functions on both the pictures are presented with the same color label: green for autocorrelation signal from the detector recording fluorescence polarized perpendicular to the excitation and blue line for parallel to it. Crosscorrelation functions are presented with black dots together with fit marked in continuous red. Bottom panels of (a) and (b) presents residues.

Such a time scale is characteristic for the fluctuations due to rotation of the fluorescence bleached beads with its absorption transition dipole moment relative to the linear polarized excitation light (for comparison see decay anisotropy data FIG. 4). Because of rather large noise of the autocorrelation curve analysis in region of rotational correlation time, we also performed crosscorrelation analysis. Resulting function shows different behavior with drop of the amplitude for short correlation times. This is an anti-correlation and it is usually recorded for highly bright molecules. Drop of crosscorrelation function in region of fast lag times results from the fact that molecules after excitation emit the fluorescence signal to the detector that recorded polarized emission in one direction, whereas the other detector does not record any signal at the same time. Such a behavior was not observed for non-bleached nanospheres because of Förster Resonance Energy Transfer (FRET) when the molecules after energy transfer lose the preferential direction of excitation. For calculating the translational diffusion coefficient, we ignored the fast part of the correlation function, which is characteristic for rotations. We obtained $D=15$ $\mu m^2/s$. The result also shows that the majority of beads enter the confocal volume as single particles. Only a very small part of spikes in the time trace originate from aggregates, which can be observed for longer lag times (in range of $10^1$ to $10^2$ ms) but they did not influence the calculated value of the translational diffusion coefficient.

In this study, a simple and rapid method for preparation of polarized fluorescent nanospheres is described. In order to achieve this goal the fluorescent nanospheres were immobilized in PVA films, bleached of non polarized light propagation and rinsed to the aqueous solution. Such prepared nanoparticles have a high anisotropy value and a reasonable brightness. We attempted to estimate the reduction in observed fluorescence. First, we compared absorptions of dissolved bleached and unbleached nanospheres and found that optical density decreased about 14 fold upon bleaching. This tells that in a bleached sample remain about 7 percent of dye molecules. However, fluorescence signal decreased only about 10 fold. Discrepancy between absorption and fluorescence data can be explained if one takes into account process of self quenching which is stronger for unbleached beads. In fact, the lifetime of bleached nanospheres increases significantly. Using oriented fluorescent nanospheres as a macromolecule label may provide a high initial anisotropy and a good brightness. Thus, polarized nanospheres with a proper functionalization or surface modification will find applications in biophysics and biology, e.g., in polarization assays. FCS is the method of choice to determine local concentrations and molecular mobility parameters. We demonstrated that this method can be used to study both, single beads and/or aggregated cluster. FLCS data also resulted in rotational correlation.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A partially fluorescent nanoparticle comprising:
a nanoparticle comprising a matrix and a fluorescent dye dispersed in or about the matrix, wherein at least a portion of the fluorescent dye has been anisotropically bleached.

2. The nanoparticle of claim 1, wherein the matrix is a sphere, bead, nanosphere, microsphere, rod, cube, pyramid, is multisided or is amorphous.

3. The nanoparticle of claim 1, wherein the anisotropic bleaching restricts the amount of homo-fluorescence energy transfer within the matrix thereby increasing the fluorescence polarization of the nanoparticle.

4. The nanoparticle of claim 1, wherein the nanoparticle is 5, 10, 15, 20, 25, 30, 40, 50, 60, 70, 80, 90, 100, 150, 200, 250, 500, 750, 1,000, 2,500, 5,000, 7,500 or 10,000 nanometers in diameter.

5. The nanoparticle of claim 1, wherein the matrix is a biocompatible polymer matrix.

6. The nanoparticle of claim 1, wherein the nanoparticle is anisotropically bleached using linearly-polarized, plane-polarized or unpolarized light.

7. The nanoparticle of claim 1, wherein the dye is at least one of a UV, a visible, or a near infrared (NIR) emitter.

8. The nanoparticle of claim 1, wherein the matrix is a polymer selected from at least one of a solid-matrix polymer or a surface activated polymer (sulfate, aldehyde-sulfate, amine-modified microspheres or biotin- and avidin-labeled nanoparticle).

9. The nanoparticle of claim 1, wherein the matrix is at least partially transparent.

10. The nanoparticle of claim 1, wherein the nanoparticle is a crystal, a crystal structure, a protein crystal, an organometallic salt, an organic liquid crystal, a plastic, a thermoplastic, a biological polymer, an inorganic particle, or a magnetic particle.

11. An anisotropic fluorescent nanoparticle, wherein the nanoparticle is anisotropically bleached and the bleaching restricts the amount of homo-fluorescence energy transfer within the nanoparticle.

12. The nanoparticle of claim 11, wherein the nanoparticle is a sphere, bead, nanosphere, microsphere, rod, cube, pyramid, is multisided or is amorphous.

13. The nanoparticle of claim 11, wherein the nanoparticle is anisotropically bleached and the bleaching results in anisotropic distribution of active fluorophores and restricts the amount of homo-fluorescence energy transfer within the nanoparticle.

14. The nanoparticle of claim 11, wherein the nanoparticle is 5, 10, 15, 20, 25, 30, 40, 50, 60, 70, 80, 90, 100, 150, 200, 250, 500, 750, 1,000, 2,500, 5,000, 7,500 or 10,000 nanometers in diameter.

15. The nanoparticle of claim 11, wherein the nanoparticle is a biocompatible polymer matrix.

16. The nanoparticle of claim 11, wherein the nanoparticle is bleached using linearly-polarized, plane-polarized, or unpolarized light.

17. The nanoparticle of claim 11, wherein the fluorescence is from a fluorescent dye that is at least one of a UV, a visible, or a near infrared (NIR) emitter.

18. The nanoparticle of claim 11, wherein the nanoparticle comprises a solid-matrix polymer or a surface activated polymer (sulfate, aldehyde-sulfate, amine-modified microspheres or biotin- and avidin-labeled nanoparticle).

19. The nanoparticle of claim 11, wherein the matrix is at least partially transparent.

* * * * *